(12) United States Patent
Fukui (10) Patent No.: US 11,079,734 B2
(45) Date of Patent: Aug. 3, 2021

(54) POSITION CONTROL SYSTEM OF A MACHINE TOOL CONTROL DRIVE BASED ON MOTOR AND OBJECT POSITION

(71) Applicant: OKUMA Corporation, Aichi (JP)

(72) Inventor: Noriyuki Fukui, Aichi (JP)

(73) Assignee: OKUMA CORPORATION, Aichi (JP)

( * ) Notice: Subject to any disclaimer, the term of this patent is extended or adjusted under 35 U.S.C. 154(b) by 169 days.

(21) Appl. No.: 16/353,315

(22) Filed: Mar. 14, 2019

(65) Prior Publication Data

US 2019/0286094 A1    Sep. 19, 2019

(30) Foreign Application Priority Data

Mar. 15, 2018    (JP) .............................. JP2018-048436

(51) Int. Cl.
  *G05B 19/19*    (2006.01)
(52) U.S. Cl.
  CPC .. *G05B 19/195* (2013.01); *G05B 2219/34319* (2013.01); *G05B 2219/41103* (2013.01)
(58) Field of Classification Search
  USPC ....................................................... 700/114
  See application file for complete search history.

(56) References Cited

U.S. PATENT DOCUMENTS

| | | | | |
|---|---|---|---|---|
| 6,097,168 A * | 8/2000 | Katoh | ........................... | 318/560 |
| 2001/0005800 A1* | 6/2001 | Shiba | ................... | G05B 19/404 |
| | | | | 700/193 |
| 2001/0008370 A1* | 7/2001 | Fujita | .................... | G05B 19/19 |
| | | | | 318/560 |
| 2009/0230910 A1* | 9/2009 | Hishikawa | ............. | B21D 24/02 |
| | | | | 318/591 |
| 2012/0271446 A1* | 10/2012 | Sato | .................... | G05B 19/4166 |
| | | | | 700/108 |
| 2014/0084838 A1* | 3/2014 | Horiguchi | .............. | G05B 19/19 |
| | | | | 318/560 |
| 2015/0362906 A1* | 12/2015 | Kuroki | ................. | G05B 19/195 |
| | | | | 700/114 |

* cited by examiner

*Primary Examiner* — Md Azad
(74) *Attorney, Agent, or Firm* — Cantor Colburn LLP (57) ABSTRACT

Respective amounts of movement of feed axes corresponding to first and second position controllers are determined, and if a value obtained by dividing a smaller amount of movement by a larger amount of movement, in the two amounts of movement, falls within a prescribed reference range, a position controller for the feed axis with the smaller amount of movement selects a detected motor position as a position feedback value and a position controller for the other feed axis selects a detected object position as a position feedback value.

2 Claims, 6 Drawing Sheets

POSITION CONTROL SYSTEM OF A MACHINE TOOL CONTROL DRIVE BASED ON MOTOR AND OBJECT POSITION

CROSS REFERENCE TO RELATED APPLICATION

The present application claims priority under 35 U.S.C. § 119 to Japanese Patent Application No. 2018-048436 filed on Mar. 15, 2018, which is incorporated herein by reference in its entirety including the specification, claims, drawings, and abstract.

TECHNICAL FIELD

The present invention generally relates to a position control system to be mounted on, e.g., a machine tool, and more particularly to a position control system that performs feedback control of a drive system based on a detected motor position from a motor position detector attached to a motor and a detected object position from an object position detector attached to the vicinity of a controlled object.

BACKGROUND

Figure 5:
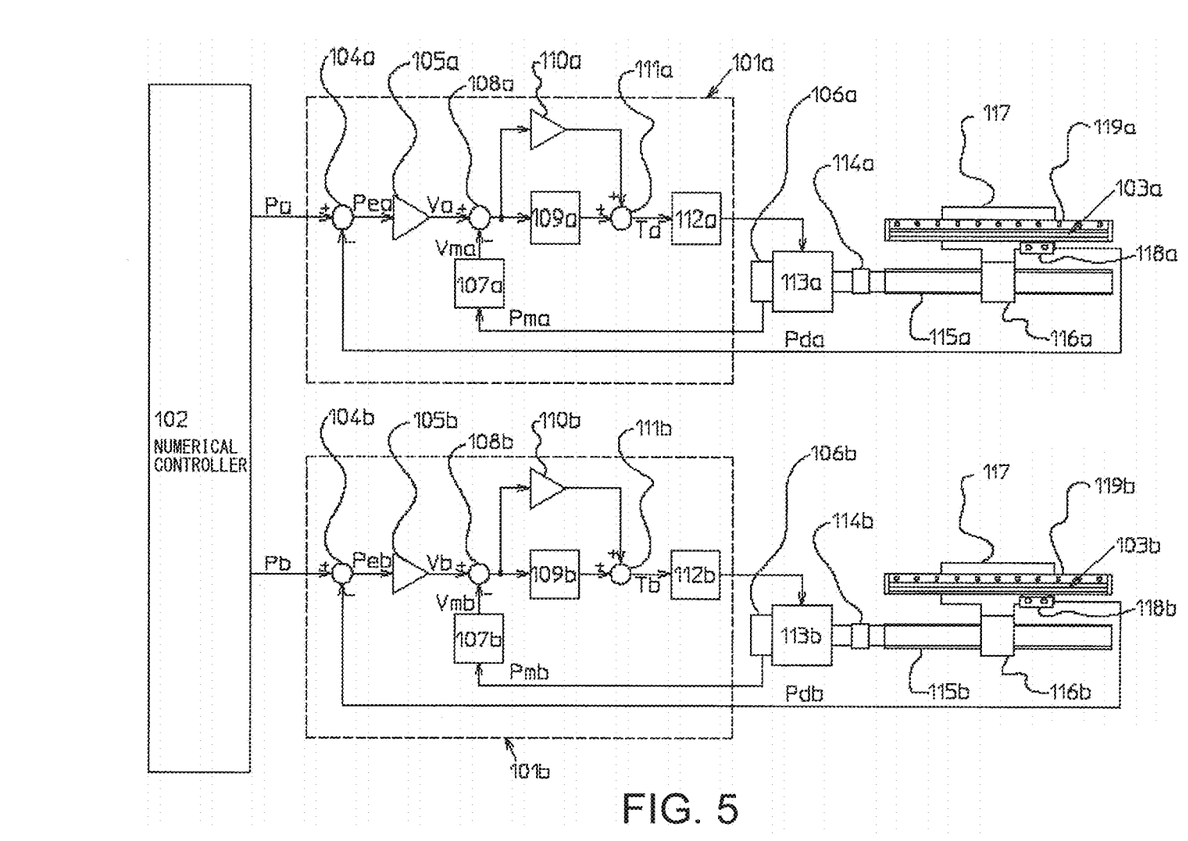
FIG. 5 is a block diagram illustrating a conventional position control system.

A schematic configuration of a feedback control system in a position control system mounted on a conventional machine tool will be described by reference to drawings. FIG. 5 is a system block diagram illustrating a schematic configuration of a conventional position control system for two feed axes, which are controlled objects. This conventional position control system includes a system that controls a position of one controlled object 117 by driving a plurality of feed axes. Although in FIG. 5, a total of two controlled objects 117, one on the first feed axis side (upper side) and one on the second feed axis side (lower side), are illustrated, these two controlled objects 117 indicate the same one. However, from the perspective of the two feed axes, to be strict, final controlled objects 117 are not the same controlled object 117 because, for example, even if the controlled objects 117 are the same controlled object 117 such as a tool post equipped with a tool, the two feed axes are in a state in which one feed axis mechanism is mounted on the other feed axis. Here, for ease of description, the controlled objects 117 will be treated as the same one.

The position control system includes a first position controller 101a and a second position controller 101b provided for the two feed axes, respectively. The first position controller 101a and the second position controller 101b are substantially the same in configuration, and thus, where there is no need to distinguish between "first" and "second," they are simply referred to as "position controller(es) 101" with suffixes a and b omitted. The same applies to other members.

Each position controller 101 calculates a difference between a command position P from a numerical controller 102, which is a higher-level apparatus, and a detected position Pd output from a linear encoder 103, via a subtractor 104, and sets the difference as a position error Pe. A velocity command calculator 105 amplifies a command velocity V with a proportional gain Kp based on the position error Pe and outputs the command velocity V. Meanwhile, the position controller 101 differentiates a detected motor position Pm from a motor position detector 106 via a differentiator 107 and sets a result of the differentiation as a detected motor velocity Vm, and calculates a difference between the detected motor velocity Vm and the command velocity V via a subtractor 108 and sets the difference as a velocity deviation. This velocity deviation is converted into a velocity deviation proportional component via a torque command calculator (velocity loop proportional gain Pv) 109 and concurrently converted also into a velocity deviation integral component via a torque command calculator (velocity loop integral gain Iv) 110, and the velocity deviation proportional component and the velocity deviation integral component are added up via an adder 111 and a result of the addition is set as torque command T. The torque command T is subjected to various types of filtering processing via a current controller 112 and then causes a current for controlling a motor 113 to be fed out.

A rotary shaft of the motor 113 rotates according to the current from the position controller 101. A ball screw 115 coupled to the rotary shaft of the motor 113 via a coupling 114 also rotates. A ball screw nut 116 joined to a controlled object 117 such as a table is restricted in a rotation direction of the ball screw 115 by, e.g., a non-illustrated guiding surface, and is driven in an axis direction of the ball screw 115 along with rotation of the ball screw 115. The detected motor position Pm from the motor position detector 106 joined to the rotary shaft of the motor 113 also changes along with the rotation of the rotary shaft of the motor 113. Furthermore, a detection head 118 of the linear encoder 103 fixed to the controlled object 117 is driven in the axis direction of the ball screw 115 along with the rotation of the motor 113, and an amount of movement of the detection head 118 relative to a scale 119 of the linear encoder 103, the scale 119 being fixed to, e.g., a non-illustrated bed, that is, the detected position Pd of the controlled object 117, also changes. The detected position Pd and the detected motor position Pm changed as stated above are fed out to the position controller 101, and feedback control is performed so as to eliminate the difference between the detected position Pd and the command position P from the numerical controller 102.

Figure 6:
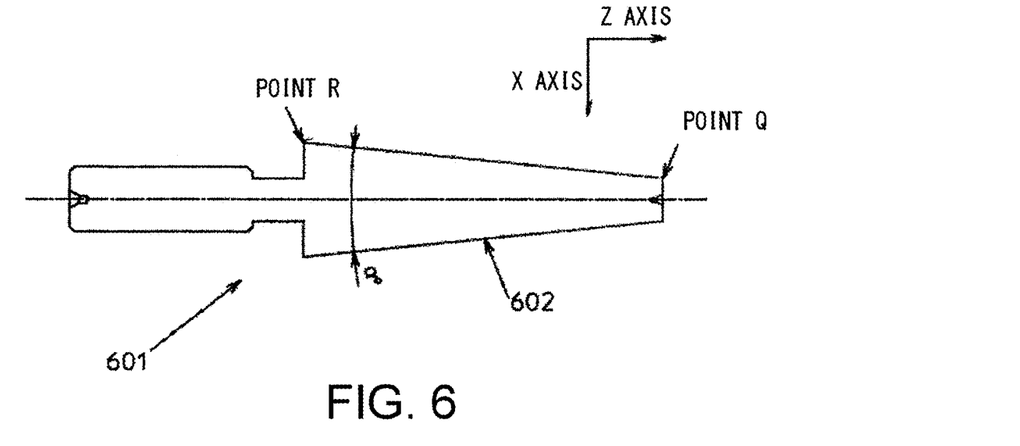
FIG. 6 is a sectional view of a tapered plug part having a tapering angle $\alpha°$.

Also, although not illustrated, the first position controller 101a and the second position controller 101b perform position control in synchronization with each other in order to operate while interpolating unit intervals of respective command positions from the numerical controller 102 as a higher-level apparatus. Here, it is assumed that: the position control system illustrated in FIG. 5 performs, for example, numerical and position control of a 1-saddle lathe; the first position controller 101a takes control of an X-axis thereof; and the second position controller 101b takes control of a Z-axis thereof. Here, where θ is an angle between a direction of movement of a tool, which is the controlled object 117, and the Z-axis, Lx is an amount of movement on the X-axis, and Lz is an amount of movement on the Z-axis, tan θ=(Lx/Lz). FIG. 6 is a sectional view of a tapered plug part having a tapering angle α°. In order to machine a tapered portion 602 of a tapered plug part 601, which is illustrated in FIG. 6, with good precision via a 1-saddle lathe, it is necessary to drive the 1-saddle lathe while interpolating micro intervals from point Q to point R on coordinates with the X-axis and the Z-axis in synchronization with each other.

Figure 7:
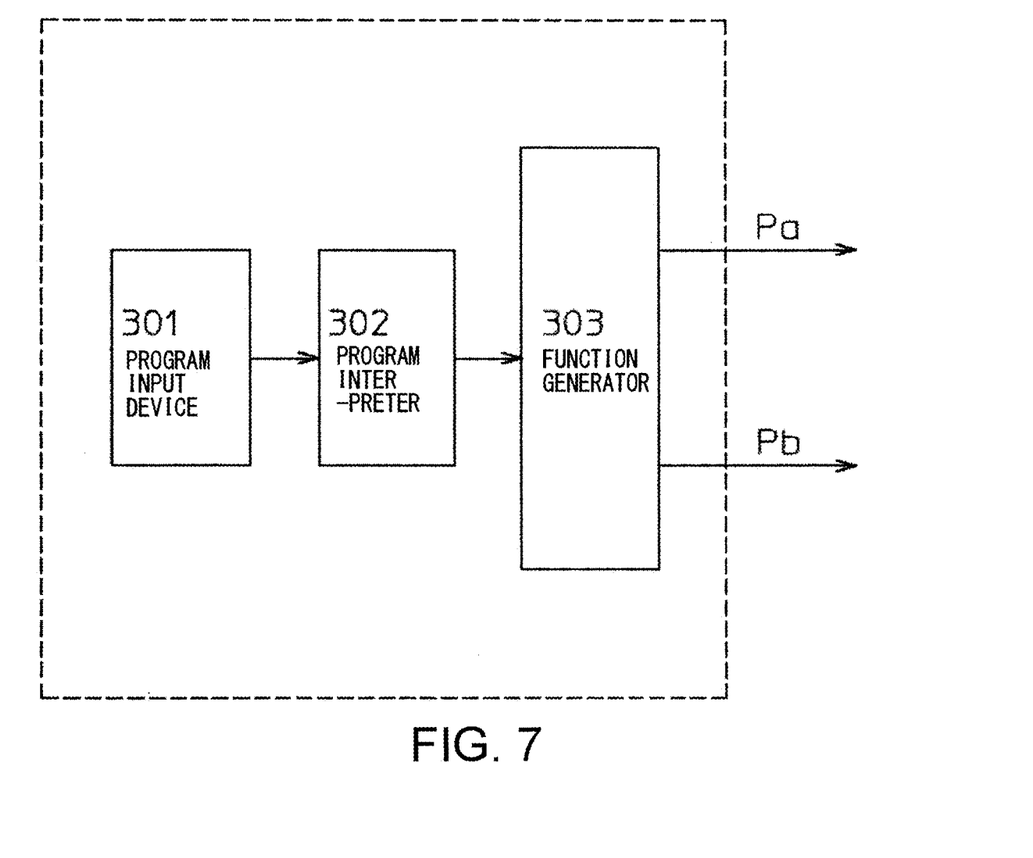
FIG. 7 is an example schematic block diagram illustrating internal processing in a conventional numerical controller.

FIG. 7 is an example schematic block diagram illustrating inner processing in a conventional numerical controller 102. A program for machining, e.g., the tapered plug part 601 is input to the numerical controller 102 via program input device 301. The program input device 301 receives, e.g., an input via a keyboard of a console and an input of transfer from a medium such as a USB memory and generally includes storage unit for storing a machining program itself. The machining program is fed out to program interpreter 302, and the program interpreter 302 generates data such as feeding directions for the respective feed axes from the machining program. The generated data are fed out to function generator 303. Upon the data being input, the function generator 303 calculates function generation positions (command positions Pa, Pb) for each control cycle of the feed axes in order to perform axial movement control of the respective feed axes. The calculated command positions Pa, Pb are fed out to the respective position controllers 101a, 101b for each control cycle of the feed axes.

Where the tapered portion 602 of the tapered plug part 601 of FIG. 6 is machined, for a machining program for machining that starts at point Q and ends at point R, the function generator 303 in the numerical controller 102 calculates a target position for each single control cycle of the feed axes according to a feed velocity designated by the machining program to determine command positions Pa, Pb for the two feed axes. Here, if it is assumed that: coordinates of point Q are (x, z)=(4.5, 100); and coordinates of point R are (x, z)=(12, 40), a feed velocity F during machining=100 mm/min and the control cycle of the feed axes is 6.4 msec, an amount of movement for each single control cycle is approximately 10.67 µm. Furthermore, an amount of movement for each single control cycle on the X-axis is approximately 1.32 µm and an amount of movement for each single control cycle on the Z-axis is approximately 10.58 µm. However, although detailed description will be omitted, the machining enters an accelerating state in the vicinity of Q, which is the start point, and enters a decelerating state in the vicinity of point R, which is the end point, and thus, the function generator 303 calculates the command positions Pa, Pb with the accelerating/decelerating state taken into consideration.

Here, in the machining of the tapered plug part 601 using the position control system described above, a detection error inherent to the linear encoder 103 causes a trajectory error of the tapering angle α° deviating from a designed value. In particular, from among detection errors inherent to the linear encoder 103, an interpolation error occurs repeatedly in a regular cycle, and thus, unevenness is generated also in the tapered surface of the tapered plug part 601 in a regular cycle.

For the linear encoder 103, although those with various features are commercially available, a linear encoder with an interpolation error of around ±0.1 µm to ±0.4 µm is selected for a feed axis of a general machine tool. Also, a wavelength of an interpolation error is a wavelength that is a fundamental pitch length of, e.g., a glass scale or a steel tape incorporated in the scale 119 of the linear encoder 103, or a wavelength obtained by division of the fundamental pitch length by an integer. There are main types of detection principle of the linear encoder 103: an optical type and a magnetic type (including an electromagnetic induction type), and in the case of the optical type, the aforementioned fundamental pitch length is generally around 8 µm to 80 µm.

On the other hand, although there are motor position detectors 106 with various interpolation errors, a motor position detector 106 with an interpolation error of around ±5 to ±20 arc seconds is selected for a feed axis of a general machine tool according to usage. In the case of a feed axis with no linear encoder 103 mounted thereon, a detected motor position Pm detected by the motor position detector 106 is used in such a manner that the detected motor position Pm is converted into Pd as a position feedback value and fed out to the subtractor 104. In this case, a degree Re of unevenness generated in the tapered surface by an interpolation error of the motor position detector 106 can be calculated according to expression (1), where the interpolation error is ±ε arc seconds and a lead of the ball screw 115 is L mm.

[Expression 1]

$$Re = \pm \frac{\varepsilon}{1296000} \times L \times 1000 (m) \quad (1)$$

Where the interpolation error of the motor position detector 106 is ±10 arc seconds and the lead of the ball screw 115 is 10 mm, the degree of unevenness generated in the tapered surface; that is, an actual amount of error on the feed axis, is ±0.077 µm. This means that an effect of the interpolation error of the motor position detector 106 is smaller than that of the interpolation error of the selected linear encoder 103, and such combination is often selected.

There are some reasons why the trouble of mounting the linear encoder 103 is taken even in such combination in a conventional machine tool, as follows. A first reason is that mounting of the linear encoder 103 enables direct detection of a pitch error of the lead of the ball screw 115. A second reason is that mounting of the linear encoder 103 enables direct detection of an error occurring due to linear expansion of, e.g., the ball screw 115 and/or the bed when a change in ambient temperature of the machine tool occurs. A third reason is that mounting of the linear encoder 103 enables direct detection of an error of the ball screw 115 twisted by a frictional resistance generated on the guiding surface for the controlled object 117. Examples of other reasons include that mounting of the linear encoder 103 enables direct detection of an error of the ball screw 115 linearly expanded by heat generated by friction between the ball screw 115 and the ball screw nut 116. In any case, the linear encoder 103 is mounted because the mounting of the linear encoder 103 enables direct detection of a current position of the controlled object 117.

As stated above, an actual error of the feed axis caused by an interpolation error of the linear encoder 103 or the motor position detector 106 is often less than ±0.4 µm and thus does not matter much for a machined surface texture in a normal machine tool. However, where the tapering angle α° of the tapered plug part 601 in FIG. 6 is a small angle, or contrarily, is a large angle close to 180°, a difference between respective amounts of movement of feed axes for the X-axis and the Z-axis becomes large, and a phenomenon in which an interpolation error of the linear encoder 103 appears in the tapered surface in an easily visible manner occurs on the feed axis with the relatively small amount of movement, because the interpolation error is extended. An example of a machined surface of a part falling within such case is a case where a decorative surface of an aluminum wheel part of an automobile is formed by machining, which can be considered a case where the tapering angle α° is large from the perspective of tapering. Such part is a part with an importance placed on good appearance, and if an error appears on a decorative surface in a regular cycle due to an interpolation error, quality of the surface is impaired. Also, in another example, in inclined surface machining or free-form machining of a surface of a mold part in a machining center, when the machining is performed with a plurality of feed axes in synchronization with each other, a phenomenon similar to the above occurs where there is an interval on coordinates in which one feed axis has an extremely small amount of movement and the other feed axis has an extremely large amount of movement.

In the above-stated background art, even though interpolation errors of linear encoders mounted on a machine tool are not so large, where machining is performed with a plurality of feed axes in synchronization with each other, upon performance of extremely gentle inclined surface machining or extremely gentle tapered surface machining, the interpolation error of the linear encoder is extended on the feed axis side with a smaller amount of movement in the plurality of feed axes, resulting in formation of an easily visible striped pattern on a machined surface. If the machined surface is a decorative surface of a mirror surface in an aluminum wheel of an automobile part, such striped pattern is a critical defect in the outer appearance, requiring, e.g., buff finishing to be performed separately after processing via a machine tool such as a lathe. In order to avoid such situation, no linear encoders are used, resulting in failure to directly detect a pitch error of the lead of each ball screw. Furthermore, when a change in ambient temperature of the machine tool occurs, an error occurring due to linear expansion of, e.g., the ball screw and/or the bed cannot be detected directly. In addition, an error of the ball screw twisted by a frictional resistance generated on the guiding surface for the controlled object cannot be detected directly. In addition, an error of the ball screw linearly expanded by heat of friction between the ball screw and a ball screw nut cannot be detected directly. In any case, if no linear encoders are mounted, a current position of the controlled object cannot be detected directly, resulting in an increase of positioning errors of feed axes.

In view of the above problem, an object of the present invention is to provide a position control system including linear encoders mounted thereon, in extremely gentle inclined surface machining or extremely gentle tapered surface machining where the machining is performed with a plurality of feed axes in synchronization with each other, the position control system preventing generation of a striped pattern attributable to an interpolation error of a linear encoder in a machined surface, while having a feature of directly detecting a controlled object remaining as much as possible.

SUMMARY

A position control system disclosed in the present specification is a position control system for controlling a position of a controlled object by driving a plurality of feed axes, the system including: an object position detector provided for each of the plurality of feed axes, each object position detector detecting a position, in a movement direction of the relevant axis, of the controlled object as a detected object position; a motor position detector provided for each of the plurality of feed axes, each motor position detector detecting a position of a motor driving the relevant feed axis as a detected motor position; a position controller provided for each of the plurality of feed axes, each position controller controlling driving of the relevant motor that drives the relevant feed axis so that a difference between a position feedback value and a command position is eliminated; and a numerical controller that outputs the command positions to the plurality of position controllers, respectively, wherein the position controller for a feed axis, a value of which falls within a prescribed reference range, the value being obtained by dividing an amount of movement of the feed axis by a larger amount in amounts of movements of the plurality of feed axes, selects a value based on the detected motor position, as the position feedback value, and a position controller for another feed axis selects a value based on the detected object position, as the position feedback value.

Also, each position controller may store a difference between the detected object position and the detected motor position at a timing of switching of the position feedback value from the value based on the detected object position to the value based on the detected motor position, as an initial difference, and during selection of the value based on the detected motor position, employ a value obtained by the detected motor position and the initial difference being added up, as the position feedback value.

A position control system according to the present invention, in extremely gentle inclined surface machining or extremely gentle tapered surface machining where the machining is performed by driving a plurality of feed axes to control a position of an object (for example, a tool), while linear encoders are mounted to enable direct detection of a current position of the controlled object, generation of an unintended striped pattern on the machined surface due to an interpolation error of a linear encoder can be prevented. In other words, employment of a position control system according to the present invention in a machine tool enables ensuring both finished dimensions of a machined product and quality of a machined surface.

BRIEF DESCRIPTION OF DRAWINGS

Embodiments of the present disclosure will be described by reference to the following figures, wherein.

EMBODIMENTS

Embodiments of the present invention will be described below with reference to the drawings.

Embodiment 1

Figure 1:
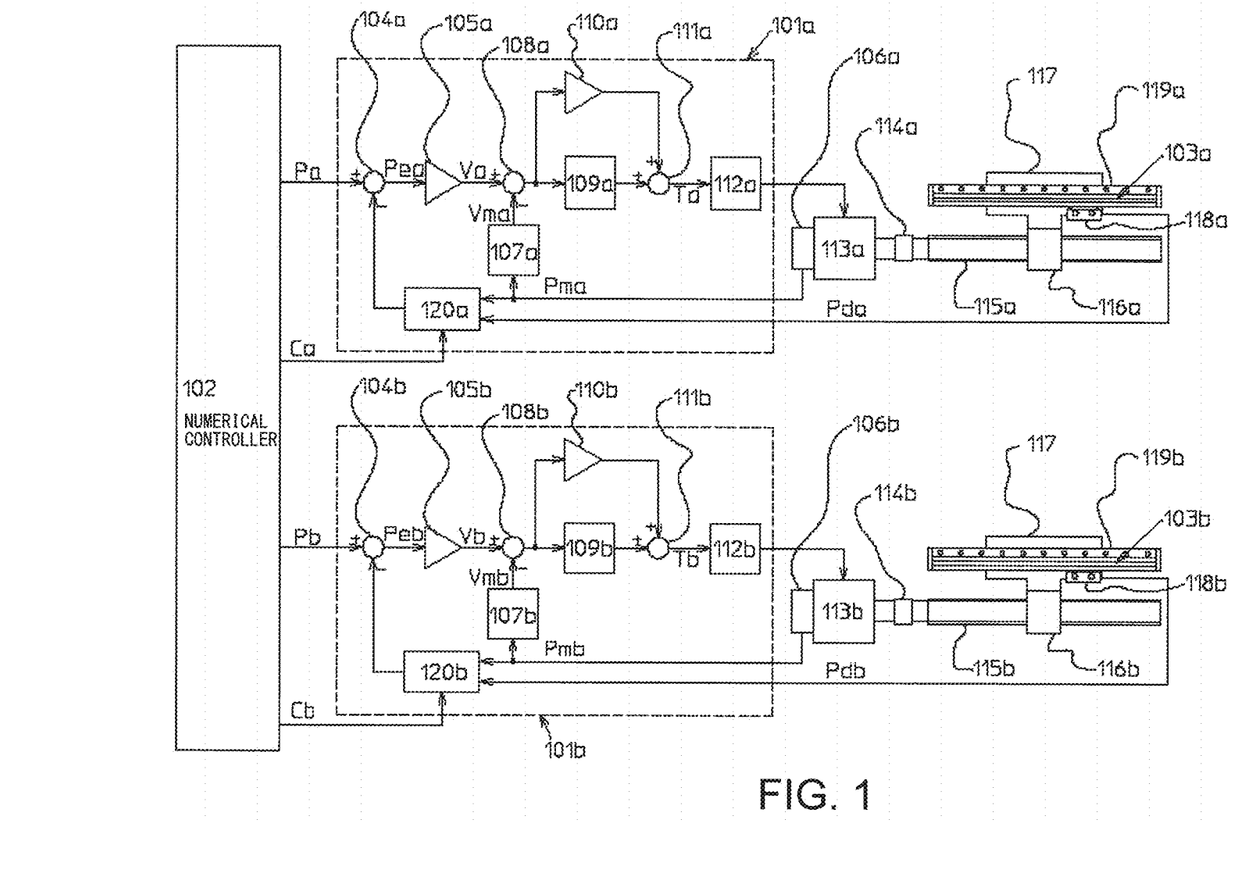
FIG. 1 is an example system block diagram illustrating a schematic configuration of a position control system according to the present invention.

FIG. 1 is an example system block diagram illustrating a schematic configuration of a position control system according to the present invention and is provided with reference numerals that are the same as those in FIG. 5 for components that are the same as those in FIG. 5. Also, description of processing that is similar to that in FIG. 5 will be omitted. The position control system includes a first position controller 101*a* and a second position controller 101*b* provided for two feed axes, respectively. Note that the first position controller 101*a* and the second position controller 101*b* are substantially the same in configuration, and thus where there is no need to distinguish between "first" and "second," suffixes a, b will be omitted, and will simply be referred to as "position controller(es) 101." The same applies to other members. A detected motor position Pm output by a motor position detector 106 and a detected object position Pd output by a linear encoder 103 are fed to a position control loop switch 120 of each position controller 101. The position control loop switch 120 receives a switching signal C for providing a command to select the detected motor position Pm or the detected object position Pd as a position control loop input (position feedback value) from a numerical controller 102 and selects either of the detected positions according to the switching signal as a position control loop input (position feedback value) and feeds the position control loop input to a subtractor 104. Processing for subtracting the detected position fed out by the position control loop switch 120 from a command position P and the subsequent processing in the subtractor 104 are similar to those in the example illustrated in FIG. 5.

Figure 2:
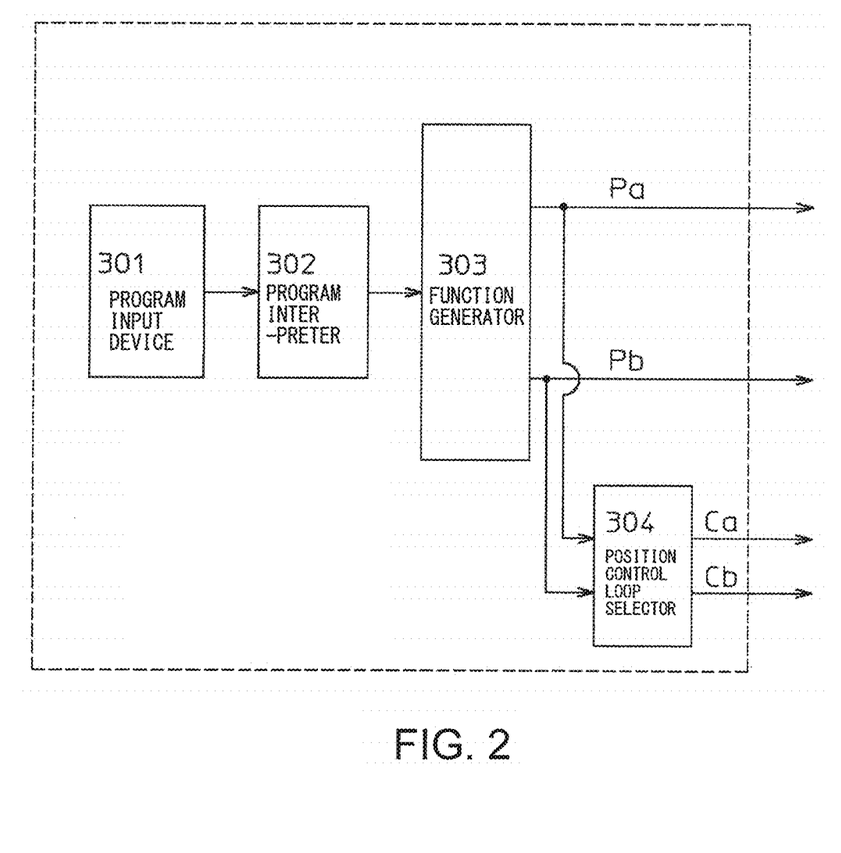
FIG. 2 is a system block diagram illustrating an example schematic configuration of a numerical controller in the position control system according to the present invention.

FIG. 2 is a system block diagram illustrating an example schematic configuration of the numerical controller 102 in the position control system according to the present invention and is provided with reference numerals that are the same as those in FIG. 7 for components that are the same as those in FIG. 7. Also, description of processing that is similar to that in FIG. 7 will be omitted. Command positions Pa, Pb for two feed axes, which have been calculated by function generator 303, are fed out not only to the position controlleres 101 but also to position control loop selector 304. The position control loop selector 304 preferably includes, e.g., a CPU with storage unit such as a ROM incorporated therein. In the storage unit, e.g., a control program for selecting a position feedback value, which will be described later, and reference range numerical values, which are references for selection, are stored. Also, where $Pa_n$, $Pb_n$ are command positions in an n-th control cycle, the storage unit in the position control loop selector 304 retains command positions $Pa_{n-1}$, $Pb_{n-1}$ in a control cycle that is one control cycle before, in addition to the current command positions $Pa_n$, $Pb_n$.

Figure 3:
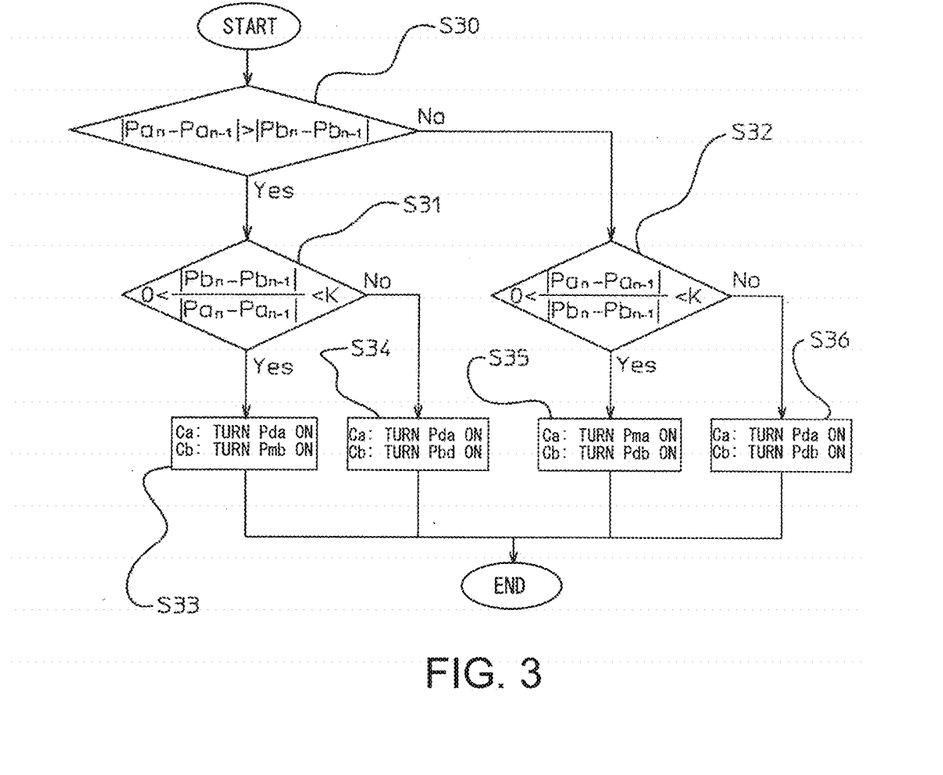
FIG. 3 is an example flowchart illustrating processing in position control loop selector 304.

FIG. 3 is an example flowchart illustrating processing in the position control loop selector 304. In S30, an amount of n-th movement of a first feed axis controlled by the first position controller 101*a* and an amount of n-th movement of a second feed axis controlled by the second position controller 101*b* are compared with each other. In other words, a feed axis with a larger amount of movement in the two feed axes is identified. The "amount of movement" here is an amount of movement of the relevant command position P and is an amount of movement in one control cycle. More specifically, the position control loop selector 304 calculates an absolute value of a difference between a current command position $P_n$ and a command position $P_{n-1}$ in a control cycle that is one control cycle before as an amount of movement. However, as necessary, the amount of movement may be calculated by another method. For example, the amount of movement to be calculated is not limited to an amount of movement in one control cycle but may be an amount of movement in a longer period of time such as two control cycles or three control cycles. Also, the amount of movement may be calculated based not on command positions but on the detected object position Pd or the detected motor position Pm.

If the amount of movement on the first position controller 101*a* side is larger (if the amount of movement of the first feed axis is larger), the position control loop selector 304 proceeds to the processing in S31, and if not (if the amount of movement of the second feed axis is larger or the first feed axis and the second feed axis are equal to each other in amount of movement), the position control loop selector 304 proceeds to the processing in S32. In S31 (where the amount of movement of the first feed axis is larger), the position control loop selector 304 determines whether or not a value obtained by dividing the amount of n-th movement of the feed axis controlled by the second position controller 101*b* by the amount of n-th movement of the feed axis controlled by the first position controller 101*a* (larger movement amount) falls within a reference range of "more than 0 but less than K." If the value obtained by the division falls within the reference range, the position control loop selector 304 proceed to S33, and if not, the position control loop selector 304 proceed to the processing in S34. Here, the reference range can freely be determined by a party utilizing the present invention. For example, where θ is an angle formed between a vector of movement of an object and a vector of movement of the feed axis with the larger amount of movement, if a range of the angle θ in which no intended striped pattern attributable to an interpolation error of a linear encoder is generated in a machined surface is 0°<θ<5°, the reference range is more than 0 but less than K=tan 5°=0.0875. Here, in the processing in S31, the result of the calculation being 0 means that the feed axis on the position controller 101*b* side is in a halting state.

In S32 (where the amount of movement of the second feed axis is larger or the first feed axis and the second feed axis are equal to each other in amount of movement), also, the position control loop selector 304 determines whether or not a value obtained by dividing the amount of n-th movement of the feed axis controlled by the first position controller 101*a* by the amount of n-th movement of the feed axis controlled by the position controller 101*b* (larger movement amount) falls within the reference range of "more than 0 and less than K." If the value obtained by the division falls within the reference range, the position control loop selector 304 proceeds to the processing in S35, and if not, the position control loop selector 304 proceeds to the processing in S36.

In S34 and S36, since the condition that "a value obtained by dividing an amount of movement of a feed axis by a larger movement amount falls within the reference range" is not satisfied, switching signals Ca, Cb for providing a command to employ detected object positions Pda, Pdb as position control loop inputs are fed out to the first and second position control loop switches 120*a*, 120*b*, respectively. On the other hand, in S33, since the value obtained by dividing the amount of movement of the second feed axis by the amount of movement of the first feed axis with the larger movement amount falls within the reference range, the position control loop selector 304 outputs a signal Cb for providing a command to employ the detected motor position Pmb as a position control loop input, to the signal second position controller 101*b* and outputs a signal Ca for providing a command to employ the detected motor position Pma as a position control loop input, to the first position controller 101*a*.

Likewise, in S35, since the value obtained by dividing the amount of movement of the first feed axis by the amount of movement of the second feed axis with the larger movement amount falls within the reference range, the position control loop selector 304 outputs a signal Ca for providing a command to employ the detected motor position Pma as a position control loop input, to a first position controller 101*a* and outputs a signal Cb for providing a command to employ a detected motor position Pmb as a position control loop input, to the second position controller 101*b*. The processing in the position control loop selector 304 is performed in such a manner as described above.

Although in the above description, only the case where one controlled object is driven by two orthogonal feed axes has been taken as an example, the technique disclosed in the present specification may be employed for the case where one controlled object is driven by more feed axes. For example, it is possible that where an orthogonal three-axis, X-, Y-, and Z-axis configuration is employed for feed axes in a machining center of a machine tool, for each of the feed axes, a value obtained by an amount of n-th movement of the feed axis by a larger movement amount is calculated, whether or not the value falls within a reference range is determined, and for a feed axis, the movement amount of which falls within the reference range, a switching signal C for selecting a detected motor position Pm as a position control loop input is output.

Embodiment 2

Figure 4:
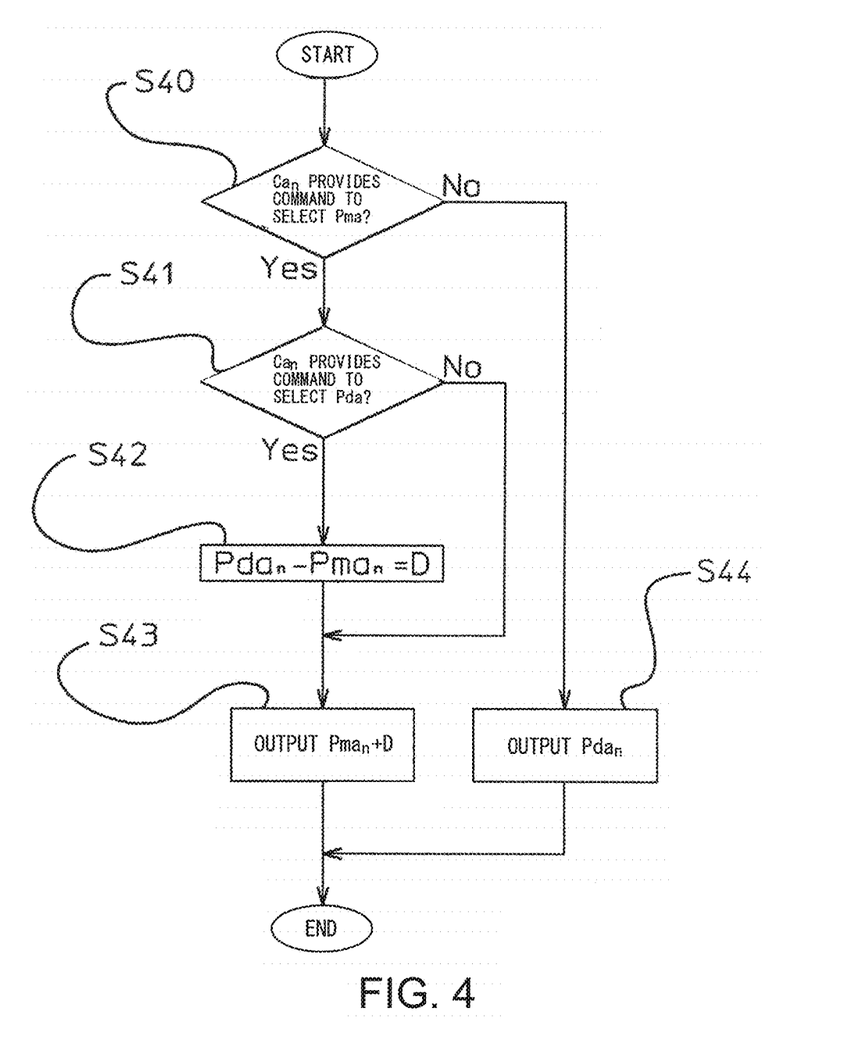
FIG. 4 is an example flowchart illustrating processing in a position control loop switch 120*a;*

Next, another embodiment will be described. Embodiment 2 is different from Embodiment 1 in that the processing in each position control loop switch 120 illustrated in FIG. 1 is complicated. Each position control loop switch 120 preferably includes, e.g., a CPU with storage unit such as a ROM incorporated therein. Also, in the below description, respective n-th data are indicated in the manner of $Ca_n$ or $Pma_n$. FIG. 4 is an example flowchart illustrating processing in a first position control loop switch 120a. In S40, a switching signal $Ca_n$ input from position control loop selector 304 is interpreted and whether or not the switching signal $Ca_n$ is a command to employ a detected motor position Pma is determined. If the content of the switching signal is a command to select a detected motor position Pma, the first position control loop switch 120a proceeds to the processing in S41 and if not; that is, if the content of the switching signal $Ca_n$ is a command to select a detected object position Pda, the first position control loop switch 120a proceeds to the processing in S44. In the storage unit incorporated in the position control loop switch 120a, a switching signal $Ca_{n-1}$ input from position control loop selector 304 in a control cycle that is one control cycle before; that is, in an n−1-th control cycle, is stored. In S41, the position control loop switch 120 determines whether or not the switching signal $Ca_{n-1}$ is a command to select a detected object position Pda. If the content of the switching signal is a command to select a detected object position Pda, the position control loop switch 120a proceeds to the processing in S42, and if not; that is, if the content of the switching signal $Ca_{n-1}$ is a command to select a detected motor position Pma, the position control loop switch 120a proceeds to the processing in S43. In S42, the position control loop switch 120a calculates a difference between an n-th; that is, current detected object position $Pda_n$ and an n-th; that is, current detected motor position $Pma_n$ as an initial difference D and proceeds to the processing in S43. Here, the initial difference D is stored in the storage unit incorporated in the position control loop switch 120a. The initial difference stored in the storage unit is not updated until calculation is newly performed in the processing in S42. Next, in S43, the position control loop switch 120a feeds out "$Pma_n+D$" obtained by adding up the detected motor position $Pma_n$ and the initial difference D stored in the storage unit, as a position control loop input (position feedback value) to a subtractor 104a. On the other hand, in S44, the position control loop switch 120a feeds out the detected object position $Pda_n$ as a position control loop input, to the subtractor 104a.

As described above, the position control loop switch 120a described in Embodiment 2 is configured to perform processing for updating an initial difference D, which is a difference between Pda and Pma, at a timing of transition of the switching signal Ca from the position control loop selector 304 from Pda selection to Pma selection, and if the switching signal Ca is one for providing a command to select Pma, outputting "$Pma_n+D$" as a position control loop input and in any other case, outputting $Pda_n$. Although in Embodiment 2, the processing in the position control loop switch 120a has been described, it should be understood that processing similar to the above is also performed in the position control loop switch 120b.

Embodiments of the present invention have been described taking the examples above. As a result of employment of either of the embodiments, where machining is performed with a plurality of feed axes in synchronization with each other, even if extremely gentle inclined surface machining or extremely gentle tapered surface machining is performed, a detected position of a linear encoder 103 that causes a machined striped pattern; that is, a defect in texture of a machined surface, is not employed for the feed axis with a smaller amount of movement in a plurality of feed axes, enabling reduction of striped unevenness in the machined surface. Furthermore, addition of Embodiment 2 enables reduction of striped unevenness in the machined surface while enjoying an advantage of direct detection of a current position of a controlled object, which is an original purpose of mounting of linear encoders 103.

Although some modes of the present invention have been described as embodiments, the present invention is not limited only to such modes. For example, in the above description, the position control loop selector 304 are described as a component inside the numerical controller 102; however, control is performed with the first position controller 101a and the second position controller 101b in synchronization with each other, and thus, an alternation of components so that the first position controller 101a and the second position controller 101b monitor amounts of movement of each other and each position controller 101 itself determines whether or not a value obtained by dividing an amount of movement of a relevant feed axis by an amount of movement of the other feed axis falls within a reference range and selects a position control loop input (position feedback value) according to a result of the determination falls within the technique of the present invention. In other words, the position control loop selector 304 may be provided not in the numerical controller 102 but in each of the position controllers 101.

REFERENCE SIGNS LIST 101 position controller, 102 numerical controller, 103 linear encoder, 104 subtractor, 108 subtractor, 105 velocity command calculator, 106 motor position detector, 107 differentiator, 111 adder, 112 current controller, 113 motor, 114 coupling, 115 ball screw, 116 ball screw nut, 117 controlled object, 118 detection head, 119 scale, 120 position control loop switch, 301 program input device, 302 program interpreter, 303 function generator, 304 position control loop selector, 601 tapered plug part, 602 tapered portion.

The invention claimed is:
1. A position control system for controlling a position of a controlled object by driving a plurality of motors provided respective for a plurality of feed axes, the system comprising:
  a plurality of object position detectors, each provided for each of the plurality of feed axes, each object position detector detecting a position, in a movement direction of the relevant axis, of the controlled object as a detected object position;

a plurality of motor position detectors, each provided for each of the plurality of feed axes, each motor position detector detecting a position of a motor driving the relevant feed axis as a detected motor position;

a position controller provided for each of the plurality of feed axes, each position controller controlling driving of the motor that drives the relevant feed axis so that a difference between a position feedback value and a command position is eliminated; and a numerical controller that outputs the command positions to the plurality of position controllers, respectively, wherein the position controller for a feed axis, a value of which falls within a prescribed reference range, the value being obtained by dividing an amount of movement of the feed axis by a larger amount in amounts of movements of the plurality of feed axes than the amount of movement of the feed axis, selects a value based on the detected motor position as the position feedback value, and the position controller for a feed axis, having the value obtained by the division falling outside the prescribed reference range, selects a value based on the detected object position as the position feedback value.

2. The position control system according to claim 1, wherein each position controller stores a difference between the detected object position and the detected motor position at a timing of switching of the position feedback value from the value based on the detected object position to the value based on the detected motor position, as an initial difference, and during selection of the value based on the detected motor position, employs a value obtained by the detected motor position and the initial difference being added up as the position feedback value.

* * * * *